(12) United States Patent
Bouvier et al.

(10) Patent No.: US 7,953,123 B2
(45) Date of Patent: May 31, 2011

(54) METHOD AND SYSTEM FOR CONTROLLING THE ESTABLISHMENT OF COMMUNICATIONS CHANNELS FOR ALLOWING TRANSMISSION OF MULTIMEDIA INFORMATION

(75) Inventors: Christian Bouvier, Limours (FR); Jean-Philippe Wary, Bourg la Reine (FR)

(73) Assignee: Societe Francaise du Radiotelephone, Paris (FR)

( * ) Notice: Subject to any disclaimer, the term of this patent is extended or adjusted under 35 U.S.C. 154(b) by 824 days.

(21) Appl. No.: 11/943,897

(22) Filed: Nov. 21, 2007

(65) Prior Publication Data

US 2008/0137598 A1 Jun. 12, 2008

(30) Foreign Application Priority Data

Dec. 6, 2006 (FR) ...................................... 06 10629

(51) Int. Cl.
*H04J 3/12* (2006.01)
(52) U.S. Cl. ........................................ 370/522; 370/524
(58) Field of Classification Search ................ 370/236.2, 370/241.1, 465–466, 431–463, 254, 395.2, 370/395.3, 522–528; 709/227–229
See application file for complete search history.

(56) References Cited

U.S. PATENT DOCUMENTS

| | | | |
|---|---|---|---|
| 6,738,349 B1 * | 5/2004 | Cen | 370/231 |
| 7,024,461 B1 | 4/2006 | Janning et al. | |
| 2003/0134622 A1 * | 7/2003 | Hsu et al. | 455/414 |
| 2004/0139088 A1 * | 7/2004 | Mandato et al. | 707/100 |
| 2005/0071459 A1 * | 3/2005 | Costa-Requena et al. | 709/224 |
| 2005/0157660 A1 * | 7/2005 | Mandato et al. | 370/254 |
| 2006/0133335 A1 * | 6/2006 | Garcia-Martin | 370/338 |
| 2008/0089324 A1 * | 4/2008 | Polk et al. | 370/389 |
| 2009/0190550 A1 * | 7/2009 | Giustina et al. | 370/331 |

FOREIGN PATENT DOCUMENTS

EP 1650925 A 4/2006

OTHER PUBLICATIONS

Elwell Siemens J McMillen Avaya JF Rey/o Rousseau Alcatel J: "Tunnelling of QSIG over SIP", IETF Standard-Working-Draft, Internet Engineering Task Force, IETF, CH, No. 3, Jan. 3, 2005, XP015037819, ISSN:0000-0004.

(Continued)

*Primary Examiner* — Kwang B Yao
*Assistant Examiner* — Kenan Cehic
(74) *Attorney, Agent, or Firm* — Perman & Green, LLP

(57) ABSTRACT

The method allows communications means to be listed, for end-to-end broadcasting of information other than that required for managing multimedia sessions. After a selection (52) of communications channels through an infrastructure for managing multimedia sessions, the method provides via the application level, the establishment of a communication specifically using the selected communications channel(s). Purely descriptive/explanatory fields of characteristics of a session may be selected at an application level and used for conveying additional information in addition to the signaling protocol. It is thus possible to change the conditions for consuming/using the multimedia contents or the established flux. Instantaneity of the services and service use conditions may be obtained by requesting for example renegotiation in real time of a service when the conditions of use are modified (iconification of a TV/Video streaming flux in order to reduce the bandwidth used).

22 Claims, 4 Drawing Sheets

OTHER PUBLICATIONS

Mills Tettey G A et al Institue of Electrical and Electronics Engineers: "Mobile voice over I (MVOIP): an application-level protocol for call hand-off in real time applications" Conference Proceedings of the 2002 IEEE International Performance, Computing and Communications Conference. (IPCCC). Phoenix, AZ, Apr. 3-5, 2002, IEEE International Performance, Computing and Communications Conference, New York, NY: IEEE, US. vol. Conf. 21, Apr. 3, 2002, pp. 271-279.

European Search Report dated Mar. 26, 2008.

French Search Report dated Jul. 9, 2007.

* cited by examiner

METHOD AND SYSTEM FOR CONTROLLING THE ESTABLISHMENT OF COMMUNICATIONS CHANNELS FOR ALLOWING TRANSMISSION OF MULTIMEDIA INFORMATION

CROSS-REFERENCE TO RELATED APPLICATIONS

This application claims priority to and the benefit of French Patent application no. 06 10629 filed on Dec. 6, 2007, the disclosure of which is incorporated herein by reference in its entirety.

TECHNICAL FIELD OF THE DISCLOSED EMBODIMENTS

The disclosed embodiments relate to telecommunications which use telephone protocols on IP (Internet Protocol) or for establishing multimedia sessions, and more particularly with the purpose of controlling the establishment of communications channels in a network managed by an operator, to a method and a system for managing multimedia sessions.

TECHNOLOGICAL BACKGROUND OF THE DISCLOSED EMBODIMENTS

A well-known data network is Internet. In an IP domain (Internet Protocol), the data network is open, which means that any terminals may communicate two-by-two, for example by using a same signaling protocol. Multimedia type sessions may thereby be created via the Internet network between two communication terminals. Convergence between voice networks and data networks is allowed by using suitable signaling protocols.

Voice technology on IP or VoIP and more generally technologies allowing establishment of multimedia sessions most frequently use the SIP protocol (Session Initiation Protocol), which is an interoperable open standard. Other signaling protocols, for example H323, MGCP (Media Gateway Control Protocol) and Megaco (this last protocol having been selected in the UMTS standard by 3GPP for controlling Media Gateways) may also be used for multimedia sessions.

The SIP protocol is standardized by the IETF (Internet Engineering Task Force) and in particular described by RFC 3261. The SIP protocol, like the H323 and MGCP protocols, was designed for establishing, modifying and terminating multimedia sessions. It is responsible for authentication and localization of multiple participants. It is also responsible for negotiation on the types of media which may be used by the different participants, by encapsulating SDP (Session Description Protocol) messages. The SIP protocol does not transport the data exchanged during the session such as voice or video. As this protocol is independent of the transmission of the data, any type of data and protocols may be used for this exchange: this is the RTP protocol (Real-time Transport Protocol) which most frequently provides audio and video sessions. A benefit from the SIP protocol is that it is not only intended for voice on IP but also for many other applications such as video telephony, instantaneous messaging, virtual reality or even video games.

As any signaling protocol, SIP incorporates a declaration phase at the home network, and phases for requesting establishment of a multimedia session, of negotiation of the features of the requested service and finally a phase for closing the multimedia session. The session initiation protocol (SIP) from version v2.0 onwards allows information exchange between the communicating entities before or during the multimedia session. In a way known per se, these exchanges may be achieved through the following methods:

INFO: allows exchange of information not affecting the state of the call (as described in RFC 2976). In certain cases, this field is used for transferring DTMF tones.

NOTIFY: allows the sending of event notifications (RFC 3265).

SUBSCRIBE: allows subscription to event notifications (as described in RFC 3265).

UPDATE: is used for updating the media parameters (cf. RFC 3311);

MESSAGE: this method defined in RFC 3428 <<SIP extension for Instant Messaging>> allows exchange of instantaneous messages between two terminals.

In a radiotelephone network for example, by using such protocols (SIP/H323/MGCP) for multimedia sessions, it is possible to exchange information through data channels parallel to voice channels. But the drawback of these information exchange methods is that they are not always supported by the underlying networks and/or simple terminals.

GENERAL DESCRIPTION OF THE DISCLOSED EMBODIMENTS

It would be advantageous to suppress one or more drawbacks of the prior art by defining a method allowing novel uses of the signaling protocol by making the most out of the potentialities of the network infrastructure supporting this type of protocol.

A teaching according to the disclosed embodiments for this purpose shows a way of using elementary methods, required for establishing a multimedia session, and a way for forwarding them through the set of networks. Through a novel use, in accordance with the standards, the simple methods are for example capable of solving the problem of real time renegotiation of the negotiated quality for the already established multimedia session.

For this purpose, the disclosed embodiments relate to a method for controlling the establishment of exchange channels so as to allow transmission of multimedia information between at least two communications terminals connected together through a telecommunications network, comprising a step for establishing a communication between a first communications terminal and a second communications terminal by using respective applications managing a determined signaling protocol with which sessions may be initiated, the first terminal performing a step for selecting at least one data exchange channel between both terminals, characterized in that the selection step is performed at an application level and the step for establishing a communication comprises the following steps:

a step for transmitting at least one request by the first terminal, intended for the second terminal, by opening a session according to the determined signaling protocol; and a step for sending by the second terminal a response representative of an unavailability for closing the session according to the determined signaling protocol;

the method comprising, during the transmitting and sending steps, a step for transmitting additional information in addition to said signaling protocol, by using said selected data exchange channel, this data exchange channel being accessible via a purely descriptive/explanatory field of the characteristics of a session, said additional information corresponding to application information not required for managing multimedia sessions.

Thus with the disclosed embodiments, it is possible to control the emergence of solutions at an application level allowing innovative/unusual uses of the infrastructures (notably SIP or IMS) of a network operator. The intrinsic operation of the signaling protocol (for example SIP) remains unchanged so as to be able to benefit from an elementary network infrastructure worldwide. It is understood that with the method, it is possible to advantageously widen the use of the methods of the signaling protocol, for example in order to exchange signaling information relating to the service and/or to its quality and to its delivery other than through the allocated data channel (RTP) between the communicating entities. With the exchange through this novel route (via contextual fields) of application information, it is possible to provide real time service.

According to another particularity, the method comprises a step by the first terminal for identifying at least one data exchange channel which may be used for the additional information transmission step, identification resulting from a step for seeking exchange channels, in which the first terminal analyzes at least one response from the second terminal to a request in which one of the purely descriptive fields has been filled with additional information, in addition to said signaling protocol.

According to another particularity, the step for searching exchange channels comprises a step by the second terminal for sending a set of response messages to requests from the first terminal.

According to another particularity, the selected data exchange channel is used for broadcasting multimedia information from end to end.

According to another particularity, the selection step comprises a selection of several data exchange channels in order to use several additional information transmission methods in parallel.

According to another particularity, the method comprises a step for negotiating communication means in real time between a client of the first terminal and a server through a communications infrastructure having a capability of forwarding application data through information and end-to-end signaling messages.

According to another particularity, at least one of the following fields is used for the step for transmitting additional information in addition to the SIP protocol:
Header of the SIP packets where session characteristics are mentioned;
Description of the response code;
Call_ID;
Branch;
TAG.

According to another particularity, at least one field associated with the MESSAGE method of the SIP protocol is used for the step for transmitting additional information in addition to the SIP protocol.

According to another particularity, at least one field associated with the SDP payload information of SIP is used for the step for transmitting additional information in addition to the SIP protocol, this SDP field in the SIP payload being defined as an option by the SIP protocol or having a structure and syntax which are not set by the SIP protocol.

According to another particularity, a Call_ID field of the SIP protocol is used for the step for transmitting additional information in addition to the SIP protocol.

According to another particularity, conditions for consuming/using the multimedia contents transmitted during said transmission step are modified by a multimedia application which consumes the multimedia contents upon receiving and taking into account the additional information conveyed through the SIP protocol.

According to another particularity, conditions for consuming/using a transmission flow established between two communications terminals are modified by multimedia applications which consume and transmit multimedia contents of each terminal upon transmitting, receiving and taking into account additional information conveyed through the SIP protocol.

This taking into account may be planned according to a protocol shared beforehand by both multimedia applications.

According to another particularity, the method comprises a step for evaluating an available bandwidth for at least one of the exchange channels identified out of session.

According to another particularity, the method comprises a step for real-time renegotiation of the delivery of a multimedia service when the conditions of use are modified through the transmission of additional information via the underlying SIP network, the renegotiation step comprising detection by the second terminal of this modification of the conditions of use, depending:

on the change in the environment of the transport networks available for the second terminal (for example detection of Wifi networks or local and/or pervasive connectivity networks);

on geographical localization conditions of the second terminal (based on information of the GPS geolocalization type or home cell type of a mobile network or home network (roaming));

on operating conditions on the second terminal itself, for example as a result of the modification of the radio environment, of the available energy (battery), of the availability of the internal processors of the second terminal (notably when the latter is a mobile terminal) depending of the number of tasks being executed within said terminal;

on the conditions for consuming and using the service, for example payment per time slot according to the connection schedule, payment depending on the displayed resolution and color rendering, degraded service depending on the geographical location, service requiring additional encryption or additional authentication because the second terminal has just been localized in an insecure area.

According to another particularity, the renegotiation step is performed in order to modify the conditions of delivery of the multimedia service following a specific action from the user. The user is thereby allowed to temporarily reduce bandwidth consumption, by iconifying a streaming TV/Video flux. In other words, when the conditions of use are modified for example at the second terminal, the size of a video window visible on the screen may be modified with the renegotiation step.

According to another particularity, the method comprises a step for storing in a memory of each of both terminals, a list of identified exchange channels which may be used out of session for transmitting multimedia information.

According to another particularity, the signaling protocol is the SIP protocol and the step for transmitting additional information in addition to said protocol comprises:
a step for writing by the first terminal a request in text format;
a step for encoding the request;
a step for sending an INVITE message by passing the request encoded in the Call-ID field.

According to another particularity, the step for transmitting additional information in addition to said protocol further comprises:

a step for sending a response message containing an indication of temporary unavailability and in which a response to the request is positioned by the second terminal in a purely descriptive or explanatory field;

a step for confirming the closing of an SIP session, in which the first terminal sends to the second terminal an acknowledgement ACK message with the same Call-ID field in order to indicate proper reception of the (definitive) response to the request.

According to another particularity, said purely descriptive or explanatory field is the <<Reason>> field (usually used for the grounds of refusal or acceptance of a request).

An additional goal is to propose in a network communications terminal an application providing novel uses of the signaling protocol by making the most out of the potentialities of the network infrastructure supporting this type of protocol.

For this purpose, the disclosed embodiments relate to a program of a processing module, directly loadable into the memory of a communications terminal with a network for controlling the steps of the method according to the disclosed embodiments when said program is executed on the terminal.

The aspects of disclosed embodiments, with its features and advantages, will become more clearly apparent upon reading the description made with reference to the appended drawings given as non-limiting examples, wherein.

Figure 5:
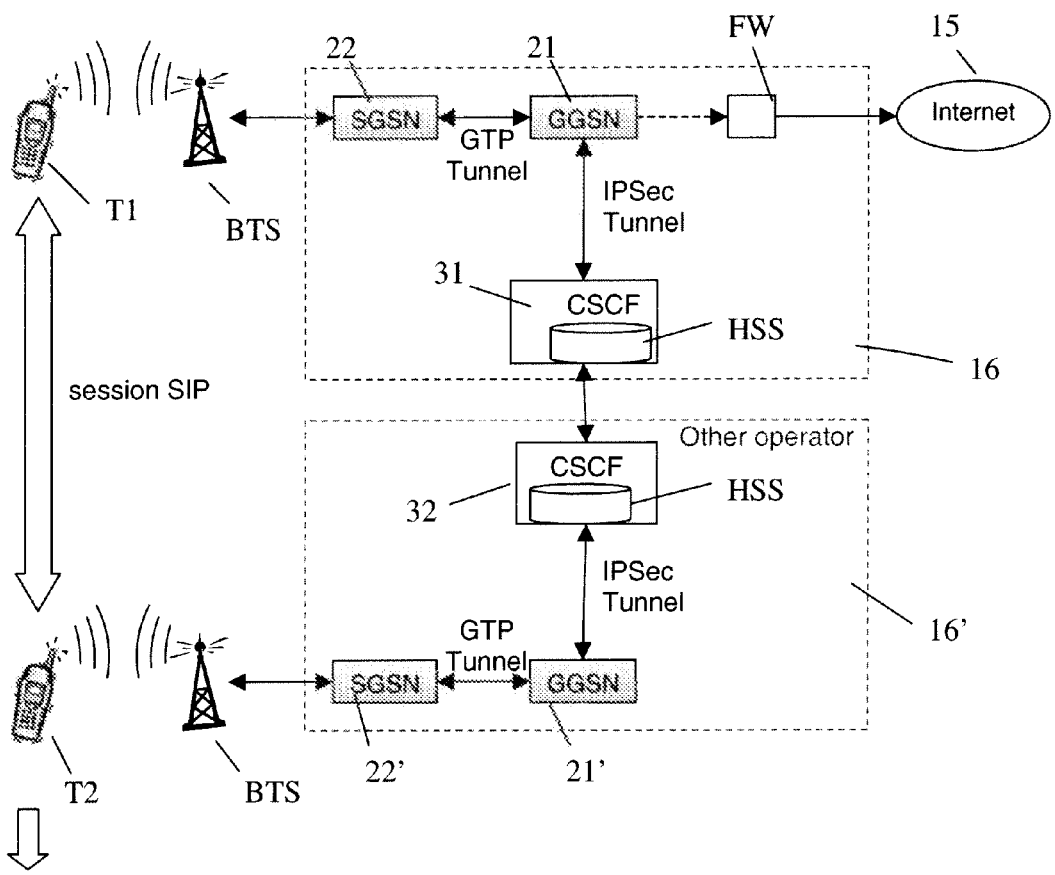
Figure 5:
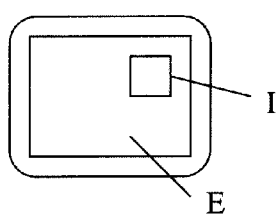

FIG. 5 schematically illustrates an IP Multimedia Subsystem (IMS) context, wherein a radiotelephone operator network is provided with a system for monitoring and managing SIP requests according to an embodiment of the disclosed embodiments.

DESCRIPTION OF THE PREFERRED EMBODIMENTS OF THE DISCLOSED EMBODIMENTS

Figure 2:
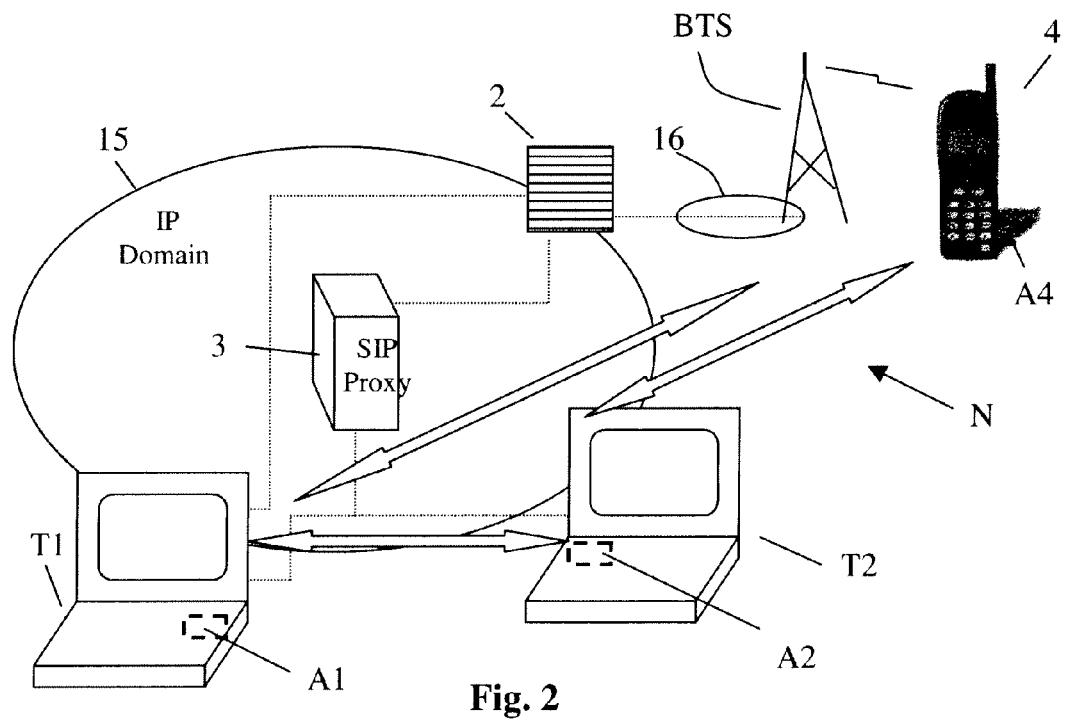
FIG. 2 shows an example of establishing signaling exchanges specific to applications of the terminals, without interfering with underlying SIP networks.

The method according to the disclosed embodiments aims at proposing signaling exchange methods at an application level by using the specificities of the SIP protocol or another signaling protocol, but without ever being detrimental to the intrinsic operation of the signaling protocol so as to be able to benefit from a worldwide network infrastructure. In the example of FIG. 2, signaling exchanges specific to the applications used should be established between the applications (A1, A2, A4) of the terminals (T1, T2, T4). Signaling information may be exchanged between these applications (A1, A2, A4) without interfering with the underlying SIP networks. The method provides identification of a plurality of information exchange possibilities in a simple communication scenario and as a non-limiting example: the use of INVITE, response and ACK and BYE.

An INVITE method indicates that the application (or the user) corresponding to the specified SIP URL address is invited to participate in a session (the body of the message describing this session, for example: the media supported by the caller); in the case of a favorable response, the guest should specify the media which it/he/she supports. The RE-INVITE method also exists.

The format of the SIP messages remains unchanged. It is reminded here that an SIP message may be both a request from a client (calling terminal) to a server (called terminal) or else a response from a server to a client. As an example, an SIP request from a client to a server may be illustrated as follows:

General, or request or entity header
Request line
(method, URI request, SIP version)
CRLF (allows specification of the end of the
header field as well as of the beginning of the
message body)
Body of the message An SIP request from a server to a client may be illustrated as follows:

Status line
(SIP version, status code, Reason sentences)
General,
or response, or entity header
CRLF (allows specification of the end of the
header field as well as of the beginning of the
message body)
Body of the message In the case of requests, a body (of the message) is either added or not depending on the method used. If for example this is an INVITE method, the body of the message of the INVITE request contains information indicating progress of the request. In the case of the responses, the body of the message is mandatory. Thus, the response to an INVITE request contains a description of the session in the body of the message.

The subscriber which via his/her terminal (T1) uses an SIP infrastructure is normally connected to the latter. He/she has passed the authentication phases and has registered at his/her SIP proxy server (3). The subscriber wanting to establish a service using the principles of the method according to the disclosed embodiments, will launch an application (A1) called a client application from his/her terminal (T1) which in a first phase will scan the potentialities of the SIP infrastructure used. To do this, the on-board client of the subscriber will transmit a set of requests to the server (3) for delivering the service or to another subscriber (terminal T2) if the required service is of the <<peer to peer>> type (P2P).

The SIP protocol is based on the sending of requests in text format. A request uses a method defined in the RFC of the protocol such as INVITE, OPTIONS, ACK, BYE, REGISTER, CANCEL, or MESSAGE (defined in the extension of the RFC). Each request contains headers (generally about ten but their number is extensible) and possibly a message body. Annex 1 provides an example of SIP requests establishing a telephone call. The process described in Annex 1 relates to the succession of steps illustrated in FIG. 3. It should be noted that in this example, a call is established: there is therefore an effect on the behavior of the SIP infrastructure.

The Call-ID, branch and tag fields are selected by the transmitting terminal (T1) and forwarded by the SIP infrastructure right up to the addressee terminal (T2). These fields only have very little requirements on format and may therefore be easily used for sending additional information from the transmitter terminal (T1) to the addressee terminal (T2). In an embodiment, for applying the method, means are provided for using this facility provided by the standard. For this, the transmitter terminal (T1) comprises a processing agent having scripts which allow these fields to be used.

It is also understood that the second addressee terminal (T2) may use the contextual field of the report for transmitting a piece of information in addition to the protocol, to the first terminal (T1). The reception of the status message with the Call_ID field filled with the value transmitted by the first terminal (T1), provides a piece of information on the fact that the datum conveyed in the <<Call-ID>> field has actually been taken into account by the second terminal (T2). In the same way, the first terminal (T1) may send back an acknowledgment ACK towards the second terminal (T2) to notify it through the tag associated with the <<from>> field that its response has indeed been taken into account.

With reference to FIG. 2, the SIP network (N) includes a first IP protocol (Internet Protocol) domain (15) with which a topology of routing options (dotted lines) and a second domain corresponding to the radiotelephone network (16) may be used. A domain of the STN (Switched Telephone Network) type may also be part of the SIP network (N).

In a preferred embodiment, the SIP network (N) illustrated in FIG. 2 uses a service architecture with an IMS subsystem (IP Multimedia Subsystem), which allows voice technology to be laid out over IP. Although the SIP network (N) is illustrated as including a radiotelephone network (16) provided with stations and a portion with a wire connection, it is understood that any wireless connection may be used in the network (N), the latter may even only use wireless connections (radio, WiFi, Wimax, Bluetooth®, etc.).

In the example of FIG. 2, the IP domain (15) has a plurality of network components, notably a media gateway (2), a proxy server (3) as well as first and second user terminals (T1, T2). Each terminal (T1, T2) may use a portion of the topology of the routing options upon establishing a communication with a radio communications terminal (4), for example a cellular terminal, connected via the radiotelephone network (16). In this case, the proxy server (3) and the gateway (2) are used. The first and second terminals may also communicate with each other by using the SIP proxy server (3) without using the gateway (2) in this case.

Figure 1:
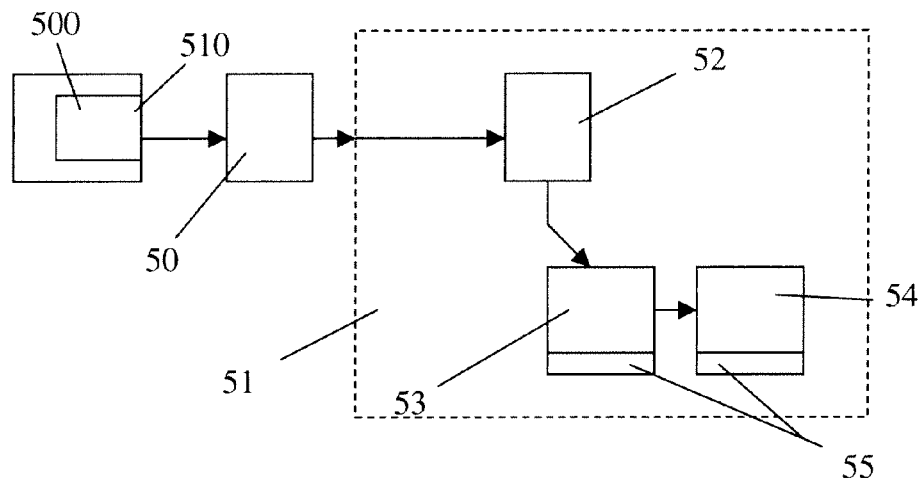
FIG. 1 illustrates a logic diagram of the steps of the method in an embodiment.

With reference to FIG. 1, the method provides the use of a data exchange channel, accessible via the signaling protocol, for end-to-end broadcasting of information other than that required for managing multimedia sessions. The method controls the establishment of exchange channels so as to allow transmission of multimedia information between communications terminals (T1, T2, 4) connected together through the telecommunications network (N).

With reference to FIGS. 1 and 2, a step (51) for establishing a communication between a first communications terminal (T1) and a second communications terminals (T2) is performed by using the respective applications (A1, A2) which manage the signaling protocol. The first terminal (T1) performs a step (500) for seeking exchange channels between both terminals (T1, T2). This step (500) for seeking exchange channels may thus provide a list of the possibilities of exchanging application information, the exchange channels may be selected during a subsequent selection step (52). A step (50) for identifying at least one exchange channel by the first terminal (T1), may be performed by the first terminal (T1), for example after each reception of a response message to one of the transmitted requests during the search step (500).

During the communication, the method may include:
a step (53) for transmitting one or more requests by the first terminal (T1), to the second terminal (T2), by opening a session according to the determined signaling protocol; and
a step (54) for sending by the second terminal (T2) a response representative of an unavailability for closing the session according to the determined signaling protocol.

In an embodiment, the method comprises a step (55) for transmitting multimedia information by using said selected exchange channel. It is understood that the use of this exchange channel does absolutely not correspond to the route used during a standard session, in which initiation of the transfer of a piece of multimedia information is performed by using the body of the message of the SIP request. Advantageously, the step (55) for transmitting additional information via this channel is performed during said transmitting and sending steps (53, 54) in addition to said signaling protocol.

This transmission step (55) is performed for example after the step (52) for selecting the exchange channel. Both of these steps (52, 55) are for example each triggered at an application level. The step (500) for seeking exchange channels may comprise a step (510) for sending by the second terminal (T2) a set of response messages to the request from the first terminal (T1). With this, the available parallel channels may be identified and listed at each of the applications (A1, A2).

Several methods underlying the principle of diverted use of communication channels will now be described. Although the described examples are focused on the SIP protocol, it should be understood that this may be extended to other signaling protocols (SIP, H323, MGCP, Megaco).

Method of the Non-Defined Fields:

The proposed technique is based on the fact of exchanging data of an application level above the signaling while cleverly using the encoding facilities proposed by the SIP protocol. The focus is on four methods which may be simply used for the exchanges by more or less combining them: all the cases of use may be generalized. It should be understood that the control method is not restricted to these four methods since the present solution more generally deals with using the signaling transport which is always present, regardless of the current consumption of the streaming flux technique (cf. the description of the exchanges between Bob and Alice in annexes 1 and 2). The four following methods may be mentioned:
Headers of the SIP packets (characteristics of the sessions);
Description of the response code (req 200 OK);
Call ID (<CSeq>);
TAG (or BRANCH).

Thus, a multitude of headers proposed in a protocol (SIP or another one) and which may be included into the messages in order to specify a little more the characteristics of the session are capable of transferring information in the signaling. In the same way, a response to a request in a given protocol, consisting of the code and of a description of the code (for example for SIP: 200 OK, 301 Moved Permanently, 404 Not Found . . . ) allows information to be transferred in the signaling: response 200 Bonjour for example.

Method Included within the MESSAGE Methods

The application (A1) of the terminal (T1) builds a request conveyed in the MESSAGE method of the SIP protocol, the format of which is established beforehand with the server/addressee which/with which it desires to access/communicate. The on-board agent then tests whether it is possible to communicate with the server (3) of the descriptive information. If the SIP network (N) forwards the MESSAGE methods, then this is the most simple means for conveying and establishing an exchange of data between applications (A1, A2) between two users (Bob et Alice). The only drawback of the MESSAGE methods is possible invoicing of the latter, in the case when the underlying network applies instantaneous messaging services; now in our problem case, renegotiation of the quality condition for delivering a multimedia content should not be invoiceable for a signaling act.

In an embodiment with the method for controlling the establishment of communication channels, it is possible to exchange signaling information so as to change the nature of the exchange information in real time, therefore that of the signaling: it may be damageable to have to use a channel subject to invoicing for establishing and exchanging signaling relating to a service being delivered.

Method Based on the Use of the SDP Payload of the SIP Protocol

The protocol SDP (Session Description Protocol) is described in RFC 2327 [2.] and is used for describing multicast sessions in session announcements or invitations. These descriptions do not inevitably set the structure and syntax of all the fields and in particular of optional fields. Among these optional fields, some of them are not described syntactically and may therefore be used according to the goodwill of the developed services. This fact is cleverly described in annex 4. As a non-limiting example, the SIP payload or SDP payload contained in the INVITE messages and certain 200 and ACK may be used for transferring data, even if no session is established. The field s= of the SDP payload is for example a name describing the session and may be used for transmitting data in a parallel way.

Application to the Call ID Method in the INVITE Message

The lack of format on these fields allows the agent/client (A1) to generate its own data and add to them a single datum providing the guarantee of uniqueness of the fields in its global nature. It is then easy to imagine within the CALL-ID field, the application of a structure of type:

<single id><control/request><associated data>

This single-id identifier may consist of a piece of information for identifying the subscriber or agent or a variable with a single value toto_MSISDN@sfr.fr-single_datum(time), such as for example:

toto_03360313130202@sfr.fr-197.118.0.10_12h3047GMT

An interesting example is the following: upon broadcasting a content in a streaming mode (as established beforehand), the client (A2) of the terminal (T2) receiving the streaming flux wishes to inform the server (3) or the transmitter (T1) of the need for temporarily lowering the quality of the flux for availability reasons of the processing unit CPU at the client (A2). The request: modification of the video quality to the value 7 for 5 minutes may be coded between AA for the descriptive field of the action and PP for the descriptive field of the parameters AAvideoAAPP7_5PP.

In order to transfer information towards the server (3) or the client (A2) of the remote subscriber, provision may be made so that the call ID field will be written as: toto_03360313130202@sfr.fr-197.118.0.10_12h3047GMT_AAvideoAAPP7_5PP. Annex 2 then illustrates the format of the request transmitted by the application (A1) of the first terminal (T1). The communicating party may then send back its/his/her responses or parameters through the descriptive field of the response code while copying out the CALL-ID. The message <<video request 7 5 being processed>> may therefore be received by the first terminal (T1). This example may be complexified by integrating notions of time delays or delay programming therein in terms of RTP frames or image sequences.

The protocol is achieved in the question/response or control/response form. The following structure <single id><control/request><associated data> enables a transport bearer to be provided to any application layer. It is thus very simple to rebuild a file transfer module which operates by using the CALL-ID and response code description channels through INVITE messages. It should also be noted that if the INVITE report is negative, no session will be established or built at the SIP server (3). The file transfer module may therefore transmit an INVITE message with the following request at the CALL-ID: <toto@MSISDN@frnce@sfr.net><modifiy video quality><7, 5>, i.e. modify the video quality by selecting level 7, for a period of 5 minutes. An exemplary response of the server is illustrated at the end of Annex 2.

The server (3) may also spontaneously ask a user to activate higher security means if the client is located in a not very secure environment by means of an INVITE request in the present example.

It is noted that the field FROM may also be used for directly conversing with a service server, since it is available for any alias value. As this field is not constrained as to its contents, it may be filled with any structure agreed beforehand which complies with the structure obligations of the standard. Another benefit from the FROM field is that generally the contents of this field will be displayed upon reception by the terminal; it is thus possible to build service offers (with interactivity) requesting actions from the user upon receiving the transmitted processing request, whether this request either relates or not to renegotiation of the service quality of the multimedia contents during broadcasting.

With reference to Annex 3, two other fields are also of interest within the scope of a parallel use of the SIP signaling according to the disclosed embodiments of the fields of the signaling protocol: <<warning field>> and <reason field>>. By reading the description of the RFC, it may be seen that these fields are of the text type and are mandatory during failures or alerts, a particularly sough-after event for not establishing a data exchange session between RTP (Real Time Protocol) communicating parties.

One of the most clever means consists in establishing a format convention at the application level for the whole of the fields of the standard left empty in order to provide a textual explanation (human readable: "the reason phrase should be human readable"). The information is thus conveyed from end to end through the SIP infrastructure without any change at the crossed servers, gateway and proxy (2, 3). This information is again found in the SIP responses and the methods.

It should also be emphasized that it is possible to avoid transmitting requests ending in failure so as not to trigger the establishment of a data channel: a new data channel may actually be advantageously established and used between two terminals (T1, T2) or even between more than two terminals (T1, T2, 4).

The embodiment of FIG. 5 shows the infrastructure of two different radiotelephone operators with a communication between these networks via CSCF (Call Session Control Function) servers (31, 32) for example provided with an HSS (Home Subscriber Server) database for recovering subscriber data. With gateways (21, 21') and switches (22, 22') provided in each of the radiotelephone networks (16, 16') messages may be forwarded right up to mobile radio communications terminals (T1, T2). A GTP (GPRS Tunnel Protocol) protocol allows communication between a gateway (21, 21') of the GGSN (Gateway GPRS Support Node) type towards a switch (22, 22') of the SGSN (Serving GPRS Support Node) type. A firewall (FW) may be placed at the interface between at least one of the radiotelephone networks (16) and the Internet type domain (15).

With IMS architecture as illustrated in FIG. 5, it is possible to access to multimedia services from mobile or fixed terminals, by using the SIP protocol on IP. The IMS subsystem is organized in three layers, which are:

the transport layer which designates the means for accessing IMS: GGSN for mobile telephones, DSLAM for ADSL, etc.;

the session controller (Call/Session Control Function or CSCF); this layer notably comprises the following servers:

the Proxy-CSCF which plays the role of an SIP proxy: all the signaling messages pass through it; it establishes an IPSec tunnel between GGSN and it;

the Serving-CSCF with which the domain may be managed: it plays the role of a SIP Registrar and allows a signaling policy to be established; it also provides routing functions (all the messages also passing through it);

the Interrogating-CSCF is the input point of a domain: it is through it that the SIP packets pass, stemming from another domain; its address is published in the DNS system (Domain Name System);

the application servers which execute the services.

Figure 3:
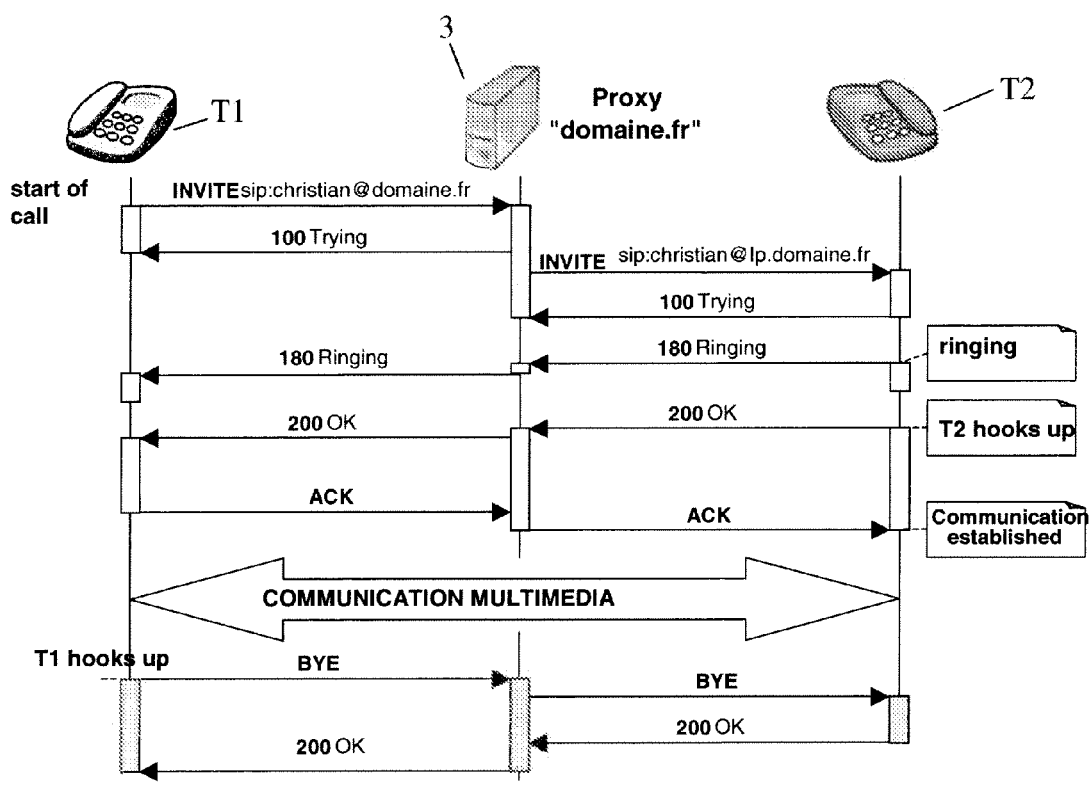
FIG. 3 illustrates a first call scenario which may be detected by using an indicator of a system according to the disclosed embodiments.

FIG. 3 provides a reminder of the conventional progress of a call scenario with a signaling protocol. The simple communications scenarii use SIP requests such as: INVITE, ACK, BYE. An SIP client terminal (T1) calls another terminal (T2) by using the INVITE message. The sent message includes information allowing establishment of media fluxes towards the calling client terminal (T1). The example hereafter illustrates an invitation message according to the SIP protocol:

```
INVITE sip christian@domaine.fr SIP/2.0
Via: SIP/2.0/UDP {my private address: port};branch={branch}
Max_forwards: 70
From: {"Christian"} <sip:{ christian@domaine.fr }>;
To: {Paul} <sip:{ paul@domaine.fr }>
Call-ID: {2966324558-edc-6548-fg8g9}
CSeq: {1} INVITE
Expires: 1800
Content-Length: {187}
```

An SIP server, for example the proxy server (3) of the domain <<domaine.fr>>, responds to an SIP request by means of one or more responses. The majority of the responses, the codes of which are of the form 2xx, 3xx, 4xx, 5xx, and 6xx, are <<final>> responses and end the current transaction. The responses of the 1xx form are temporary responses. An exemplary response is provided hereafter:

```
SIP/2.0 100 Trying
Via: SIP/2.0/UDP {my private address: port};branch={branch}
From: {"Christian"} <sip:{ christian@domaine.fr }>;
To: {Paul}<sip:{ paul@domaine.fr }>
Call-ID: {2966324558-edc-6548-fg8g9}
CSeq: {1} INVITE
```

In the example of FIG. 13:
response code <<100>> means <<Trying>> during the processing:
response code <<180>> means <<Ringing>> in progress; and
response code <<200>> means <<OK>>.

In order to understand the notion of transactions and of retransmission of messages, it should be recalled here that an SIP dialog is identified by the combination of the <<From>>, <<To>>, Call-ID fields and of the sequence number <<Cseq>>. When dialog is established, all the requests and responses should include these header fields. Each transaction is identified by the common value of the <<Cseq>> header (the name of the method and the sequence number should be identical). With the system according to the disclosed embodiments, the type of transmitted requests with the associated responses may be analyzed in each transaction and the transactions compared with each other.

Figure 4:
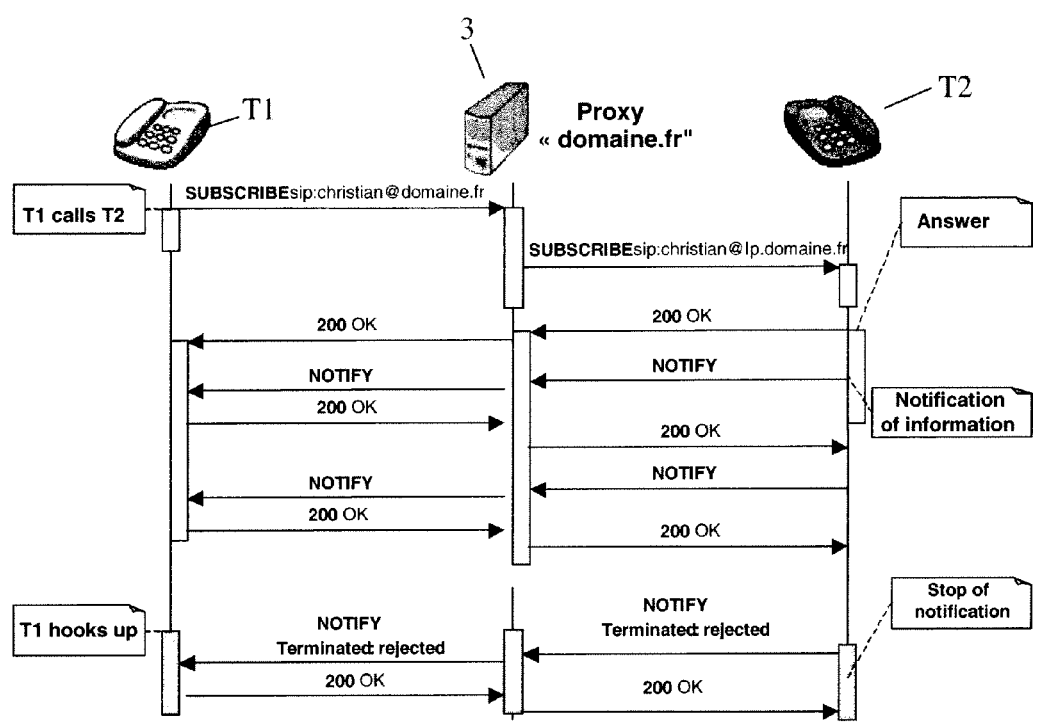
FIG. 4 illustrates a second call scenario which may be detected by using an indicator of a system according to the disclosed embodiments.

With reference to FIG. 4, generic requests such as SUBSCRIBE and NOTIFY may also be controlled and used during the step (55) for transmitting multimedia information. By using the requests SUBSCRIBE and NOTIFY, it is possible to broadcast from end to end, information other than that required for managing multimedia sessions. Both of these generic requests may be routed by the proxy servers (3) with the headers <<From>> and <<To>> and they are acknowledged by responses. The SUBSCRIBE request is sent by the client terminal (T1) who/which wishes to receive certain events, to a server (3) which generates the events (for example: a request of presence information to an application of the friend list type <<buddy list>>). The request SUBSCRIBE includes in the header, <<Expires>> which indicates the duration of the subscription. The notified request is used for sending notifications of events. These requests SUBSCRIBE and NOTIFY may create an SIP dialog, they do not need any INVITE request and they may be sent asynchronously at any moment.

It is thus very simple to achieve above an SIP infrastructure a communications system on the question/response basis. With the example of the call-ID field, if a first terminal (T1) for example wants to transmit to a second terminal (T2) an elementary request for querying a database, then:

the first terminal (T1) writes it elementary request in text format;

it then encodes its request in base-64; and then it sends an INVITE message to the second terminal (T2) by passing the encoded request in the CALL-ID field.

The second terminal (T2) responds with the code 480 (temporarily unavailable) and positions in the reason-code field, the response of the request to a database. The first terminal (T1) then sends back an acknowledgment ACK with the same Call-ID for confirming closing of the SIP session and good reception of the result of the request. The SIP infrastructure will consider that the call never made it and that the session is ended, but a request will have been processed through the SIP infrastructure.

It is understood that it is easy to complexity the protocol for loading a succession of requests in fields such as CALL-ID. One skilled in the art will appreciate that it is sufficient to establish a convention for identifying the first packet, identifying the packet of order N and the last packet (see the SIP INVITE definition: RFC 2543 and RFC 3261). With the example of FIG. 3, it is possible to show the relative simplicity of the communication scenario by using INVITE/ACK and BYE.

In an embodiment, the method provides polling/scanning of open channels. Most of the examples mentioned earlier simply use the Call-ID field for conveying the requests, and this bidirectionally by the power of the SIP protocol. But certain SIP infrastructures do not forward the Call-ID information from end to end, in particular if an SIP proxy server (3) rewrites these data. This is possible at SIP protocol level since the only constraint is that the information consisting of TO, FROM and CALL ID should identify a unique peer-to-peer connection.

The use of the <<from>> field as an exchange activator may then be necessary. In the case when the fields <<from>> are also found to be restrained by the SIP proxy server (3) because of limitations of its capacities, diagrams based on the use of the TO field may be contemplated.

Within the scope of the use of the FROM field, the request is encoded in the latter and the diagram shown with the Call-ID remains identical (cf. Annexes 1-2). Within the scope of the TO field, the receiving terminal (T2) used by Bob makes a request to the terminal (T1) of Alice but by targeting a specific (pseudo) alias of Alice asking her to call back in order to allow transfer of the request. Alice therefore calls back and in return, the terminal (T2) conveys her request in one of the provided contextual fields: the response will come back at the acknowledgment ACK level or if this method is not available in the network, it may be agreed at the level of rejection of the request that, in return for a request identifier, Bob calls back Alice in order to transmit his request identifier to her and so that the latter answers back to him upon rejection.

Several methods are therefore possible for cleverly making the most out of the power of the SIP protocol, but it is necessary to agree on which of these methods one wishes to use and in particular to detect which one may be used on an SIP network (N) and this automatically. The operating principle of the scan (polling) is based on using a set of methods, sequentially, until an operational method is detected on this infrastructure.

During the phase for discovering available parallel channels, the on-board agent/client transmits an INVITE request to the addressee by successively filling the available fields and may thereby establish a mapping of the parallel communication means available for reaching the communicating party. By extension, the agent may establish a mapping of the parallel communication means available for reaching N communicating parties or servers, by extension, notions of groups of addressees may also be always managed relatively to mapped parallel communication means.

The description of the tests required for discovering parallel communication means may be pre-coded sequentially. A grammar may describe the list of the fields of the signaling protocol that the application (A1, A2) or agent may use and evaluate. Once mapping is achieved, evaluation of the available bandwidth may be contemplated for each of the parallel channels by a succession of recurrent tests on the availability of the mapped parallel channels.

Several options are possible, the client (A1, A2) remains with the first operational method. The client tests all the known methods and selects the one of his/her choice on random, ordinal criteria or depending on the nature of the information which he/she wishes to exchange with his/her communicating party. The client (A1, A2) uses several methods in parallel, if the SIP infrastructure allows several of these methods and may dedicate/particularize each method to well-specified service sub-types.

Of course, it is understood that the clients (A1, A2) within the scope of a peer-to-peer service between two or N users, or the server (3) and the client (A1, A2) in the first case have agreed beforehand on a convention on the protocol and structure of the information which are exchanged so as to remain intelligible. The resulting advantage is to use the SIP infrastructure in an optimum way in order to establish an exchange of multimedia data via RTP. One does not cease using the SIP infrastructure and one further manages to change the nature or the quality or even the exchanged service via the already established RTP data link, without trying to break the latter so as to re-establish another one. It is thereby possible to force a reduction of quality in the delivery of the contents if the peer to peer client and servers or clients of the users detect an alteration of the available bandwidth at the level of their monitoring of transfers/exchanges. This type of change today is very difficult to implement and requires for most of the time that the established session be broken in order to rebuild another one.

In order to reduce the consumption of bandwidth, the receiving terminal (T2) may for example iconify, or reduce the display size of the video by proportionally reducing the required bandwidth (therefore reduction of the TV/video streaming flux). In the example of FIG. 5, a reduced window (I) is thereby used for viewing the received multimedia (images/video) contents. This window (I) has a much smaller format than that of the screen (E) of the receiving terminal (T2) and the contents may be viewed with lesser definition, so that bandwidth may be saved. As an example, bandwidth consumption may be voluntarily reduced for certain phases of the broadcasting of a trailer, at the moment of the credit titles for example. The conditions of use upon receiving the multimedia contents may be taken into account in order to automatically adjust the consumption of bandwidth.

One of the advantages of the disclosed embodiments is to provide control on new protocols used notably in managing multimedia services such as video telephony, voice on IP, exchange of files, messaging, etc. In particular, the method according to the disclosed embodiments may provide control on the use of the parallel channels in voice protocols on IP and implementation of communications channels in real time giving possibility to the users of changing the quality of the consumed service, the level of the service and the type of the service by implementation of flexible signaling independent of the access bearer. Further, a service application layer may advantageously be provided for offering to the applications, means for communicating with the server centers independently of the filtering policies and functional capacities of the underlying signaling servers.

The method according to the disclosed embodiments may be applied to many services, such as for example messaging push services, interactivity services in consuming new media (for example an interactive television or peer-to-peer type exchanges within communities), services for real-time negotiation of the service quality.

It should be obvious to those skilled in the art that the disclosed embodiments provide embodiments in many other specific forms without departing from the field of application of the disclosed embodiments as claimed. Consequently, the present embodiments should be considered as illustrative but may be modified in the domain defined by the scope of the appended claims and the disclosed embodiments should not be limited to the details given above.

---

ANNEX 1

INVITE sip:bob@fr.sfr.com SIP/2.0
Via: SIP/2.0/UDP 197.118.0.10:5060;branch=z9hG4bK894348304
From: <sip:alice@fr.sfr.com>;tag=EX4EvRd7LY
To: <sip:bob@fr.sfr.com>
CSeq: 1 INVITE
Call-ID: uutnq5001qwJiG@197.118.0.10
Max-Forwards: 70
user-agent: X-lite
Content-Type: application/sdp

ANNEX 1

Content-Length: 370
SIP/2.0 180 Ringing
From: <sip:alice@fr.sfr.com>;tag=EX4EvRd7LY
To: <sip:bob@fr.sfr.com>
CSeq: 1 INVITE
Call-ID: uutnq5001qwJiG@197.118.0.10
Max-Forwards: 70
user-agent: X-lite
Content-Type: application/sdp
Content-Length: 370
SIP/2.0 200 OK
From: <sip:alice@fr.sfr.com>;tag=EX4EvRd7LY
To: <sip:bob@fr.sfr.com>
CSeq: 1 INVITE
Call-ID: uutnq5001qwJiG@197.118.0.10
Max-Forwards: 70
user-agent: X-lite
Content-Type: application/sdp
Content-Length: 370
ACK sip:bob@fr.sfr.com SIP/2.0
Via: SIP/2.0/UDP 197.118.0.10:5060;branch=z9hG4bK894348304
From: <sip:alice@fr.sfr.com>;tag=EX4EvRd7LY
To: <sip:bob@fr.sfr.com>;tag=XFXF445Rd7
CSeq: 1 INVITE
Call-ID: uutnq5001qwJiG@197.118.0.10
Max-Forwards: 70
user-agent: X-lite
Content-Type: application/sdp
Content-Length: 370

ANNEX 2

For transferring information towards the server or agent of the remote subscriber The call ID:
toto__03360313130202@sfr.fr-
197.118.0.10__12h3047GMT__AAvideoAAPP7__5PP
INVITE sip:bob@fr.sfr.com SIP/2.0
Via: SIP/2.0/UDP 197.118.0.10:5060;branch=z9hG4bK894348304
From: <sip:alice@fr.sfr.com>;tag=EX4EvRd7LY
To: <sip:bob@fr.sfr.com>
CSeq: 1 INVITE
Call-ID: toto__03360313130202@sfr.fr-
197.118.0.10__12h3047GMT__AAvideoAAPP7__5PP
Max-Forwards: 70
user-agent: X-lite
Content-Type: application/sdp
Content-Length: 370
For sending back responses or parameters through the response code description field, while copying out the CALL-ID SIP/2.0 180 7 5 video request being processed
From: <sip:alice@fr.sfr.com>;tag=EX4EvRd7LY
To: <sip:bob@fr.sfr.com>
CSeq: 1 INVITE
Call-ID: toto__03360313130202@sfr.fr-
197.118.0.10__12h3047GMT__AAvideoAAPP7__5PP
Max-Forwards: 70
user-agent: X-lite
Content-Type: application/sdp
Content-Length: 370
Response of the server CALL ID: <toto@MSISDN@frnce@sfr.net><modify video quality><7, 5>
400 KO <acknowledgement of the request: video quality modified from 14 to 7>
SIP/2.0 400 7 5 video request taken into account
From: <sip:alice@fr.sfr.com>;tag=EX4EvRd7LY
To: <sip:bob@fr.sfr.com>
CSeq: 1 INVITE
Call-ID: toto__03360313130202@sfr.fr-

ANNEX 2

197.118.0.10__12h3047GMT__AAvideoAAPP7__5PP
Max-Forwards: 70
user-agent: X-lite
Content-Type: application/sdp
Content-Length: 370

ANNEX 3

Establishment of a new data channel (cf. standard fields left free)

Warning method
Warning: 307 isi.edu "Session parameter 'foo' not understood"
Warning: 301 isi.edu "Incompatible network address type 'E.164'"
Reason method
The Reason header field MAY appear in any request within a dialog, in any CANCEL request and in any response whose status code explicitly allows the presence of this header field. The syntax of the header field follows the standard SIP parameter syntax.
Reason        = "Reason" HCOLON reason-value *(COMMA reason-value)
reason-value  = protocol *(SEMI reason-params)
protocol      = "SIP"/"Q.850" / token
reason-params = protocol-cause / reason-text
/ reason-extension
protocol-cause = << cause >> EQUAL cause
cause         = 1*DIGIT
reason-text   = "text" EQUAL quoted-string
reason-extension = generic-param
Reason: SIP ;cause=580 ;text="Precondition Failure"

ANNEX 4
Description of a session with SDP v = (protocol version)
o = (owner/creator and session identifier) username session id version network type address type address
s = (session name)
i = * (session information)
u = * (URI of description: link to more information)
e = * (email address of the person responsible for the session ->
e = mjh@isi.edu (Mark Handley) or e = Mark Handley mjh@isi.edu)
p = * (phone number -> p = +44-171-380-7777 or p = +1 617 253 6011)
c = * (connection information - not required if included in all media)
c = network
type address type connection address/TTL
b = * (bandwidth information) b = modify: bandwidth-value
One or more time descriptions (see below)
z = * (time zone adjustments) z = adjustment time offset adjustment time offset
. . . eg z = 2882844526 −1 h 2898848070 0
k = * (encryption key) k = method[:encryption key]
a = * (zero or more session attribute lines) a = attribute[:value]
Zero or more media descriptions (see below)
Time description
t = (time the session is active) t = start time stop time values given in the format NTP protocol
r = * (zero or more repeat times) r = repeat interval active duration list of offsets from start-time
Media description
m = (media name and transport address) m = media port[/number of ports] transport fmt list (ports are in succession)
i = * (media title)
c = * (connection information - optional if included at session-level)
b = * (bandwidth information)
k = * (encryption key)

Attributes noted in italics are optional. The information described by SDP will be different according to the SAP (Service Advertising Protocol) frame type. Among these optional fields, some are not described syntactically and may therefore be used according to the goodwill of the developed services.

The invention claimed is:

1. A method for controlling the establishment of exchange channels so as to allow transmission of multimedia information between at least two communications terminals connected with each other through a telecommunications network, comprising:
   establishing a communication between a first communications terminal and a second communications terminal by using respective applications which manage a determined signaling protocol allowing initiation of sessions, the first terminal selecting at least one data exchange channel between both terminals,
   identifying, by the first terminal, the at least one data exchange channel which may be used for transmitting additional information, the identification resulting from seeking the exchange channels, wherein the first terminal analyzes at least one response from the second terminal to a request wherein one of a purely descriptive fields was filled with additional information in addition to said signaling protocol,
   wherein selecting at least one data exchange channel between both terminals is performed at an application level, and establishing the first communication between the first communications terminal and the second communications terminal comprises:
      transmitting at least one request by the first terminal to the second terminal by opening a session according to the determined signaling protocol; and
      sending by the second terminal a response representative of an unavailability for closing the session according to the determined signaling protocol;
      wherein during transmitting the at least one request and sending the response, transmitting additional information in addition to said signaling protocol, by using said selected data exchange channel, this data exchange channel being accessible via a purely descriptive/explanatory field of the characteristics of a session, said additional information corresponding to application information not required for managing multimedia sessions.

2. The method according to claim 1, wherein seeking exchange channels comprises sending by the second terminal a set of response messages to requests from the first terminal.

3. The method according to claim 1, wherein the selected data exchange channel is used for end-to-end broadcasting of multimedia information.

4. The method according to claim 1, wherein selecting at least one data exchange channel between both terminals comprises a selection of several data exchange channels in order to use several methods for transmitting additional information in parallel.

5. The method according to claim 1, comprising negotiating real-time communication means between a client of the first terminal and a server through a communications infrastructure having a capacity of forwarding through signaling information and messages, application data from end to end.

6. The method according to claim 1, wherein at least one of the following fields is used for the transmitting of additional information in addition to a Session Initiation Protocol (SIP):
   Header of the SIP packets where session characteristics are mentioned;
   Description of the response code;
   Call_ID;
   Branch;
   TAG.

7. The method according to claim 1, wherein at least one field associated with a MESSAGE method of a Session Initiation Protocol (SIP) is used for transmitting additional information in addition to the SIP.

8. The method according to claim 1, wherein at least one field associated with Session Description Protocol (SDP) information of a Session Initiation Protocol (SIP) payload is used for transmitting the additional information in addition to the Session Initiation Protocol, this SDP field in the SIP payload being defined as optional by the SIP protocol or having a structure and syntax which are not set by the SIP protocol.

9. The method according to claim 1, wherein a Call_ID field of a Session Initiation Protocol (SIP) is used for transmitting the additional information in addition to the SIP.

10. The method according to claim 1, wherein conditions for consuming/using the multimedia information transmitted during the transmitting of the additional information are modified by a multimedia application consuming the multimedia contents upon receiving and taking into account additional information conveyed through a Session Initiation Protocol.

11. The method according to claim 10, wherein said conditions for consuming/using the multimedia information transmitted during the transmitting of the additional information are modified depending on a change in an environment of available transport networks for the second terminal.

12. The method according to claim 10, wherein said conditions for consuming/using the multimedia information transmitted during the transmitting of the additional information are modified depending on a change in the geographic localization conditions of the second terminal.

13. The method according to claim 10, wherein said conditions for consuming/using the multimedia information transmitted during the transmitting of the additional information are modified depending on a change in intrinsic operating conditions of the second terminal.

14. The method according to claim 10, wherein said conditions for consuming/using the multimedia information transmitted during the transmitting of the additional information are modified depending on a change in the conditions for delivering a service received by the second terminal.

15. The method according to claim 1, wherein conditions for consuming/using a transmission flux established between two communications terminals are modified by multimedia applications consuming and transmitting the multimedia contents of each terminal upon transmitting, receiving and taking into account additional information conveyed through a Session Initiation Protocol.

16. The method according to claim 1, comprising for evaluating an available bandwidth for at least one of the exchange channels identified out of session.

17. The method according to claim 1, comprising renegotiating in real time a service when conditions of use are modified at the second terminal, the renegotiation step being performed in order to reduce consumption of bandwidth, while modifying the size of a video window visible on a screen.

18. The method according to claim 1, comprising storing in a memory of each of both terminals a list of identified exchange channels which may be used out of session for transmitting multimedia information.

19. The method according to claim 1, wherein the signaling protocol is a Session Initiation Protocol and transmitting additional information in addition to said protocol comprises:
   writing by the first terminal a request in text format;
   encoding the request;
   sending an INVITE message while passing the encoded request in a Call-ID field.

20. The method according to claim 19, wherein transmitting additional information in addition to said protocol further comprises:
- sending a response message containing an indication of temporary unavailability and wherein a response to the request is positioned by the second terminal in a purely descriptive or explanatory field;
- confirming closing of a Session Initiation Protocol session, wherein the first terminal sends to the second terminal an acknowledgement message ACK with the same Call-ID field to indicate good reception of the response to the request.

21. The method according to claim 20, wherein said purely descriptive or explanatory field is a <<Reason>> field.

22. A non-transitory computer readable medium storing a program of a processing module directly loadable in a memory at least one of the two communications terminals within the network for controlling the method of claim 1 when said program is executed on the at least one of the two communication terminals.

* * * * *

UNITED STATES PATENT AND TRADEMARK OFFICE
CERTIFICATE OF CORRECTION

| | | |
|---|---|---|
| PATENT NO. | : 7,953,123 B2 | Page 1 of 1 |
| APPLICATION NO. | : 11/943897 | |
| DATED | : May 31, 2011 | |
| INVENTOR(S) | : Christian Bouvier et al. | |

It is certified that error appears in the above-identified patent and that said Letters Patent is hereby corrected as shown below:

Column 1, line 11, delete "Dec. 6, 2007" and insert --Dec. 6, 2006--

Column 18, line 48, Claim 16, before "evaluating" delete "for".

Signed and Sealed this
Twentieth Day of December, 2011

David J. Kappos
*Director of the United States Patent and Trademark Office*